(12) United States Patent
Sörensen

(10) Patent No.: US 7,016,336 B2
(45) Date of Patent: Mar. 21, 2006

(54) ADMINISTRATIVE DOMAINS FOR PERSONAL AREA NETWORKS

(75) Inventor: Johan Sörensen, Eslöv (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 922 days.

(21) Appl. No.: 09/952,707

(22) Filed: Sep. 14, 2001

(65) Prior Publication Data
US 2002/0061009 A1 May 23, 2002

Related U.S. Application Data

(60) Provisional application No. 60/252,461, filed on Nov. 22, 2000.

(51) Int. Cl.
H04L 12/28 (2006.01)
H04L 12/56 (2006.01)
H04Q 7/24 (2006.01)

(52) U.S. Cl. ...................... 370/351; 370/255; 370/338; 370/395

(58) Field of Classification Search ........ 370/230–255, 370/331–349, 351–395, 410–437; 455/426–432, 455/435–445, 450–455; 709/201–227, 230–250
See application file for complete search history.

(56) References Cited

U.S. PATENT DOCUMENTS

| | | | |
|---|---|---|---|
| 5,740,160 A | | 4/1998 | Ikegami et al. |
| 6,307,843 B1 * | | 10/2001 | Okanoue .................... 370/312 |
| 6,665,300 B1 * | | 12/2003 | Caves et al. ............. 370/395.2 |
| 6,775,258 B1 * | | 8/2004 | van Valkenburg et al. .. 370/338 |
| 6,829,288 B1 * | | 12/2004 | Orava ........................ 375/132 |
| 6,879,570 B1 * | | 4/2005 | Choi ........................... 370/329 |
| 6,879,832 B1 * | | 4/2005 | Palm et al. ................. 455/445 |
| 6,891,833 B1 * | | 5/2005 | Caves et al. ............. 370/395.2 |
| 2001/0007815 A1 * | | 7/2001 | Philipsson ................... 455/41 |
| 2001/0012757 A1 * | | 8/2001 | Boyle ........................ 455/11.1 |
| 2001/0023446 A1 * | | 9/2001 | Balogh ....................... 709/229 |
| 2001/0029166 A1 * | | 10/2001 | Rune et al. .................... 455/41 |
| 2002/0039367 A1 * | | 4/2002 | Seppala et al. ............. 370/401 |
| 2002/0058504 A1 * | | 5/2002 | Stanforth .................... 455/426 |

FOREIGN PATENT DOCUMENTS

WO 00/69186 11/2000

OTHER PUBLICATIONS

Wu, C. W., et al., "Amris: A Multicast Protocol for Ad Hoc Wireless Networks" Milcom 1999. IEEE Military Communications. Conference Proceedings (Cat. No. 99CH36341) Proceedings of Conference on Military Communications (Milcom /'99) Atlantic City, NJ USA Oct. 31, 1999.

* cited by examiner

Primary Examiner—Man U. Phan
(74) Attorney, Agent, or Firm—Potomac Patent Group PLLC

(57) ABSTRACT

A system and method for determining whether to establish a connection between a first node and a second node in an ad-hoc network includes the step of sending from the first node to the second node a first message, where the first message includes a network identifier and a point of attachment identifier. The first message is received by the second node and the network identifier and the point of attachment identifier of the first message is compared with a network identifier and point of attachment identifier stored in the second node. The second node determines whether to establish the connection between the first node and the second node based upon the comparison. The point of attachment identifier is associated with a node of the ad-hoc network that provides communication with another network, which the node identifies, via an access point of the other network.

6 Claims, 7 Drawing Sheets

ADMINISTRATIVE DOMAINS FOR PERSONAL AREA NETWORKS

A claim for priority under 35 U.S.C. § 119(e) is hereby made to Application No. 60/252,461 filed in United States on Nov. 22, 2000.

BACKGROUND

The present invention is related to a network technology, and more particularly to an ad-hoc wireless network technology, such as Bluetooth, for communicating with public and private local area networks (LANs).

Recently, a radio interface referred to as Bluetooth was introduced to provide wireless, ad hoc networking between mobile phones, laptop computers, headsets, PDAs, and other electronic devices. Some of the implementation details of Bluetooth are disclosed in this application, while a detailed description of the Bluetooth system can be found in "BLUETOOTH—The universal radio interface for ad hoc, wireless connectivity," by J. C. Haartsen, Ericsson Review No. 3, 1998. Further information about the Bluetooth interface is available on the Official Bluetooth Website on the World Wide Web at http://www.bluetooth.org.

Bluetooth was initially developed to eliminate cables between phones, PC-cards, wireless headsets, etc., but has evolved into an ad-hoc wireless network technology intended for both synchronous traffic, such as voice based traffic, and asynchronous traffic, such as IP based data traffic. Bluetooth promises to provide the ability for any commodity device, such as telephones, PDAs, laptop computers, digital cameras, video monitors, printers, fax machines, to be able to communicate via a radio interface. The commodity devices must contain a Bluetooth radio chip and associated software.

Bluetooth is a wireless communication technology operating in the unlicensed 2.4 GHz ISM (Industrial, Scientific, and Medical) band using a fast frequency-hopping scheme to minimize interference with non-Bluetooth sources. The frequency-hopping occurs nominally at 1,600 hops per second. The system has 79 possible channels, with a typical channel spacing of 1 MHz. Two or more Bluetooth (BT) units sharing the same channel form a piconet, as illustrated in FIG. 1. Each BT unit in a piconet may perform the functions of either a master or slave. Within each piconet there is always exactly one master and up to seven active slaves. Any BT unit can perform the functions of a master in a piconet.

Furthermore, two or more piconets can be wirelessly interconnected to form a scatternet, as illustrated in FIG. 2. The connection point between the two piconets consists of a BT unit that is a member of both piconets. A BT unit can simultaneously be a slave member of multiple piconets. However, a BT unit may only be a master in one piconet at a time, but may simultaneously participate as a slave in other piconets. A BT unit may only transmit and receive data in one piconet at a time, so participation in multiple piconets is done on a time division multiplex basis.

The Bluetooth system provides full-duplex transmission built on slotted Time Division Duplex (TDD), where each slot is 0.625 ms long. The time slots are cyclically numbered sequentially using a large cycle of $2^{27}$. Master-to-slave transmission always starts in an even-numbered time slot, while slave-to-master transmission always starts in an odd-numbered time slot. An even-numbered master-to-slave time slot and its subsequent odd-numbered slave-to-master time slot together comprise a frame, except when multi-slot packets are used. There is no direct transmission between slaves in a Bluetooth piconet, only between master and slave and vice versa.

Communication within a piconet is organized so that the master polls each slave according to a polling scheme. A slave typically transmits after being polled by the master, with minor exceptions described below. The slave starts its transmission in the slave-to-master time slot immediately following the packet received from the master. The master may or may not include data in the packet used to poll a slave. The only exception to the above principle is that when a slave has an established Synchronous Connection Oriented (SCO) link, which is described further below, the slave may continue to transmit in the pre-allocated slave-to-master time slot, even if not explicitly polled by the master in the preceding master-to-slave time slot.

A globally unique 48 bit IEEE 802 address, called the Bluetooth Device Address (BD_ADDR), is assigned to each BT unit at the time of manufacture, and it is never changed. In addition, the master BT of a piconet assigns a local Active Member Address (AM_ADDR) to each active member of the piconet. The AM_ADDR, which is only three bits long and is assigned and cleared dynamically, is unique only within a single piconet. The master uses the AM_ADDR when polling a slave in a piconet. However, when the slave transmits a packet to the master, in response to a packet received from the master, the slave includes its own AM_ADDR in the packet header, not the master's.

All data is transmitted in packets, which can carry both synchronous data, on SCO links such as voice traffic, and asynchronous data, on Asynchronous Connectionless (ACL) links. An acknowledgment and retransmission scheme is used for ACL link packets to ensure reliable transfer of data. Forward error correction (FEC) may also be employed in the form of channel coding.

The standard format of a Bluetooth packet is illustrated in FIG. 3, although certain control packets may use a different format. The AM_ADDR is located in the packet header followed by some control parameters, for example, a bit indicating an acknowledgment or a re-transmission request of the previous packet, when applicable, and a header error check (HEC).

The format of the payload depends on the type of packet. The payload of a typical ACL packet consists of a header, a data field and a cyclic redundancy check (CRC), except AUX1 type packets. The payload of an SCO packet consists of only a data field. In addition there are hybrid packets including two data fields, one for synchronous data and one for asynchronous data. Packets in which the payload does not include a CRC are neither acknowledged nor re-transmitted.

The protocol layers of a Bluetooth system are illustrated in FIG. 4. The Baseband, LMP and L2CAP are existing Bluetooth specific protocols. The "high level protocol or application" layer represents protocols that may or may not be Bluetooth specific, while the Network layer does not exist in the current Bluetooth specifications (version 1.1).

Since transmission in a piconet is exclusively between the master and a slave, and vice versa with the slave always using its own AM_ADDR, there is no way for a slave to send data to another slave within a piconet. There are no provisions for a slave to address another slave in a direct communication. Hence, a slave can only communicate with the master of the piconet, while the master can communicate with all the slaves.

Another limitation of the Bluetooth system is that in the current standard specifications there is no way to address and route packets from one piconet to another. Inter-piconet communication in a scatternet is not specified.

An important aspect of Bluetooth ad-hoc networking is IP (Internet Protocol) support in a Bluetooth scatternet or piconet, that is, how to run IP on top of the Bluetooth protocol stack. There are currently two basic proposals for providing IP support. The first proposal is to regard each Bluetooth piconet as an IP subnet and let IP route packets between nodes in different piconets. The second proposal is to regard an entire Bluetooth scatternet as an IP subnet. A Network Adaptation Layer (NAL) is inserted between the L2CAP and IP layers, as illustrated in FIG. 5. The NAL emulates a shared medium network, for example, a broadcast medium, which is assumed by the IP layer.

The first proposal suffers from a number of problems, partly because the Bluetooth piconets are not shared medium networks. The second proposal is also problematic, but is more promising. The present invention applies the NAL approach of the second proposal. It is assumed that NAL is an extension of Bluetooth Network Encapsulation Protocol, which is currently a specification work in progress in the Personal Area Networking (PAN) working group in the Bluetooth SIG. Therefore, the Bluetooth scatternet is effectively a bridged Ethernet network, as seen from higher protocol layers, such as IP.

The NAL layer must support a number of features, including a routing mechanism to route packets within a scatternet (there are several ad-hoc routing protocols proposed for this purpose), while emulating a single shared medium network to the IP layer. Regardless of the routing scheme used to route packets through a scatternet, BT units that are members in more than one piconet must forward packets from one piconet to another. These BT units may be referred to as forwarding nodes.

A number of mechanisms in an IP network, for example the ARP (Address Resolution Protocol) and DHCP (Dynamic Host Configuration Protocol) mechanisms, rely on a broadcast mechanism on the underlying link layer, which is usually a shared medium network. Therefore, support for broadcast messages in a Bluetooth scatternet is an important feature of the NAL layer.

The NAL layer can include functions for automatic network formation, which allows nodes to discover neighboring nodes automatically and connect to each other for the purpose of establishing a basic connectivity to facilitate higher-level service discovery. Applications may then use the network for application protocol interactions, according to user interactions or predetermined preferences/criteria.

An automatic network formation scheme may also include nodes discovering and connecting to access points providing access to non-ad-hoc networks, for example fixed wired networks, such as a LAN. FIG. 6 illustrates a possible network topology, where some Bluetooth nodes provide connectivity to the wired network via Bluetooth Access Points AP1 and AP2.

Assuming the wired network is configured with an Ethernet technology, the access points can provide bridging between Bluetooth nodes and the nodes of the wired network. This is possible because the Ethernet packet format can be encapsulated on the Bluetooth side, and the Bluetooth BD_ADDRs are assigned in the same address range as, for example, Ethernet/Token Ring/Token Bus network cards.

When bridging is performed, it is important to limit unnecessary broadcast propagation in the network, and it is imperative to prevent broadcast loops. Limiting broadcast propagation through access points can be accomplished by performing filtering within the access points. However, preventing broadcast loops is particularly problematic when a Bluetooth scatternet is connected at two or more places to a wired network via Bluetooth access points. Another possible implementation to consider is a situation where a Bluetooth scatternet is connected at two or more BTs to access points in different wired networks, which may be owned and operated by different organizations.

Scalability and security in automatic network formation are other issues that must be addressed. Ideally, nodes need the ability to join in a "public" scatternet, for applications such as anonymous gaming, as well as "private" scatternets for more sensitive applications. A question arises regarding how to restrain nodes from inappropriately forming interconnections between a public and private scatternet.

The work performed by the MANET working group within the IETF (Internet Engineering Task Force) is representative of the state-of-the-art in the ad-hoc routing area. A mobile ad-hoc network (MANET) is an autonomous system of mobile routers, and their associated hosts, connected by wireless links. The mobile routers are free to move randomly and organize themselves arbitrarily. Thus, the network's wireless topology changes rapidly and unpredictably. A MANET may operate in a standalone fashion, or may be connected to the Internet.

Applying MANET protocols at the Bluetooth NAL layer may solve the problem with broadcast loops within the scatternet, but does not address the problem of broadcast loops with scatternets bridged to a LAN, or of bridging LANs together.

The IEEE develops standards for LANs employing, for example, Ethernet and Wireless LAN network technologies. The IEEE 802.1D [5] standard describes the operation of Ethernet bridges, and defines a spanning tree algorithm and protocol that is executed by bridging devices to avoid the broadcast loop problem in bridged Ethernet networks. However, there is no proposed solution for the problems caused by unintentional erroneous interconnection of organizationally separated networks through Bluetooth scatternets.

The IEEE 802.11 wireless LAN technology does have a mechanism to assign a "network identity" to access points that belong to the same network. This network identity is also configured into all client devices using the network to prevent their erroneous connection to a neighboring company's network in cases of radio coverage overlap. However, while in ad-hoc mode, all IEEE 802.11 LAN cards synchronize to the same channel.

Yet another relevant technology is Virtual LANs (VLAN). VLANs are described in IEEE 802.1Q [7], which introduces a possibility for tagging of Ethernet frames with their VLAN identity.

The protocols mentioned above, while relevant, are not particularly efficient in the context of Bluetooth. Even when applied together in every conceivable combination, they fail to address all the aforementioned problems, such as the formation of broadcast loops when scatternets are bridged to LANs at multiple BTs, the prevention of inappropriately interconnected LANs, and scoped scatternets (public/private). For example, requiring all Bluetooth nodes to be able to perform the IEEE 802.1D functions would solve the scatternet problem and the problem with broadcast loops when scatternets are bridged to LANs at multiple BTs. However, this solution would not prevent inappropriate interconnection between LANs that should remain separated. It is also widely believed in the PAN working group, but not universally accepted, that the use of a spanning tree is inappropriate, since the spanning tree is a proactive approach that doesn't optimize the network topology in any way, but only fixes the broadcast loop problem.

The MANET ad-hoc routing protocols are more appropriate for adaption to Bluetooth, since they are reactive, and thus respond better to changing topologies. However, using an ad-hoc routing protocol in Bluetooth scatternets presents other complications, such as the broadcast loop problem that occurs when scatternets are bridged to LANs at multiple BTs.

Accordingly, there is a need to provide a method of interfacing ad-hoc wireless networks to wire networks that eliminates broadcast loops when scatternets are bridged to LANs at multiple BTs, that prevents the formation of inappropriately interconnected LANs, and that addresses the concerns regarding scoped scatternets (public/private).

SUMMARY

The present invention addresses these and other concerns. A system and method for determining whether to establish a connection between a first node and a second node in an ad-hoc network is described.

According to one aspect, a method for determining whether to establish a connection between a first node and a second node in an ad-hoc network includes sending a first message from the first node to the second node, the first message including a network identifier and a point of attachment identifier. The second node receives the first message and compares the network identifier and the point of attachment identifier of the first message with a network identifier and point of attachment identifier stored in the second node to determine whether to establish the connection between the first node and the second node based upon the comparison.

According to another aspect, in an electronic device adapted to communicate in an ad-hoc network, a method for determining whether to establish a connection between the electronic device and another node of the ad-hoc network includes receiving from the other node, at the electronic device, a first message, the first message including a network identifier and a point of attachment identifier. The electronic device compares the network identifier and the point of attachment identifier of the first message with a network identifier and point of attachment identifier stored in the electronic device and determines whether to establish the connection between the electronic device and the other node based upon the comparison.

According to yet another aspect, an electronic device adapted to communicate in an ad-hoc network and to determine whether to establish a connection with another node of the ad-hoc network includes a transceiver that receives a first message transmitted from the other node, the first message including a network identifier and a point of attachment identifier. The electronic device also includes comparing means that compares the network identifier and the point of attachment identifier of the first message with a network identifier and point of attachment identifier stored in a storage of the electronic device and determining means that determines whether to establish the connection between the other node and the electronic device based upon the comparison.

According to still another aspect, a computer program product in an electronic device adapted to communicate in an ad-hoc network includes a computer-readable storage medium having computer-readable program code means embodied in said medium. The computer-readable program code means include logic that receives a first message, at the electronic device, from another node of the ad-hoc network, the first message including a network identifier and a point of attachment identifier, logic that compares the network identifier and the point of attachment identifier of the first message with a network identifier and point of attachment identifier stored in a storage of the electronic device, and logic that determines whether to establish the connection between the electronic device and the other node based upon the comparison.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which.

DETAILED DESCRIPTION

Preferred embodiments of the present invention are described below with reference to the accompanying drawings. In the following description, well-known functions and/or constructions are not described in detail to avoid obscuring the invention in unnecessary detail.

The invention employs a three part approach to eliminating the associated problems. First, scatternets and access points are associated with an Administrative Domain (AD), which is simply a collection of hosts, routers, and the interconnecting network(s) managed by a single authority. The AD is identified by an Administrative Domain Identifier (ADI), which is unique for distinct networks. For example, a 128-bit Universal Unique Identifier (UUID) may be used, since it can be self-assigned by any entity and still be universally unique.

Second, each node in a Bluetooth scatternet keeps track of an associated Administrative Domain Attachment Point (ADAP). The ADAP may be represented as a 48-bit IEEE MAC (media access control) address, which is interchangeable with a Bluetooth MAC addresses (BD_ADDR).

Third, Bluetooth scatternet members keep track of their "upstream" connection(s) to the ADI/ADAP they are associated with.

Figure 1:
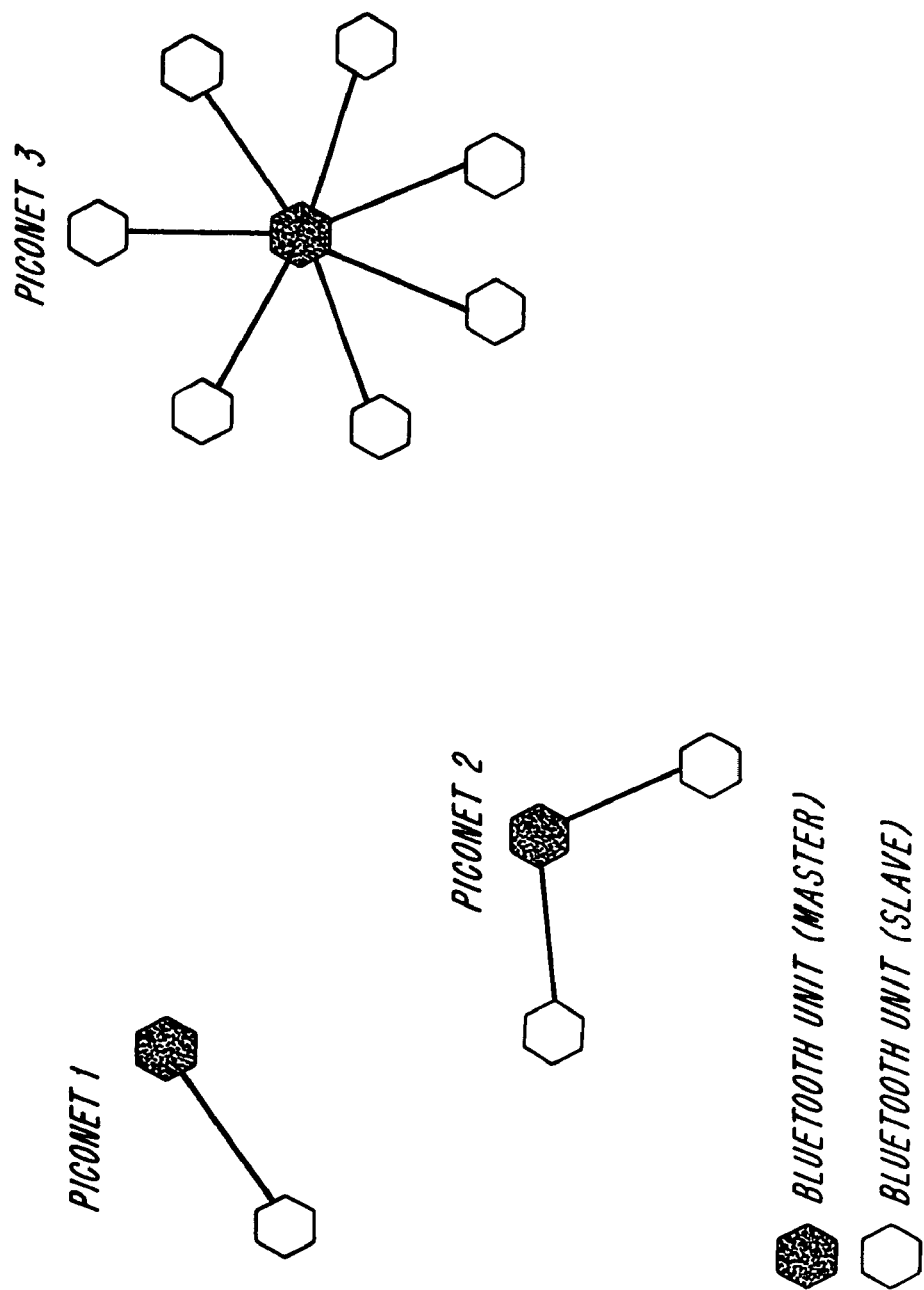
FIG. 1 is a diagram illustrating Bluetooth piconets.
Figure 2:
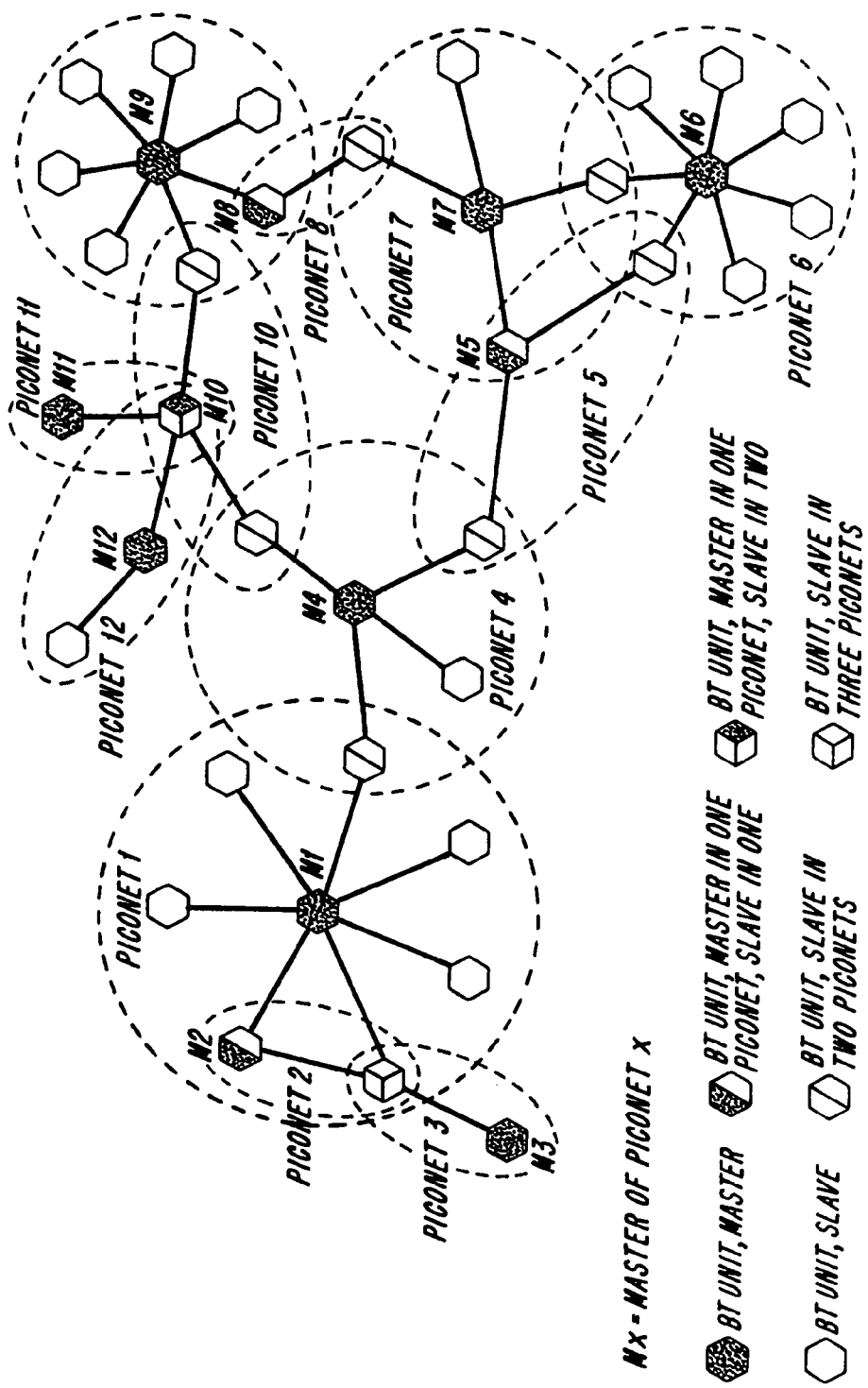
FIG. 2 is a diagram illustrating a Bluetooth scatternet.
Figure 3:
FIG. 3 is a diagram illustrating a Bluetooth packet format.
Figure 4:
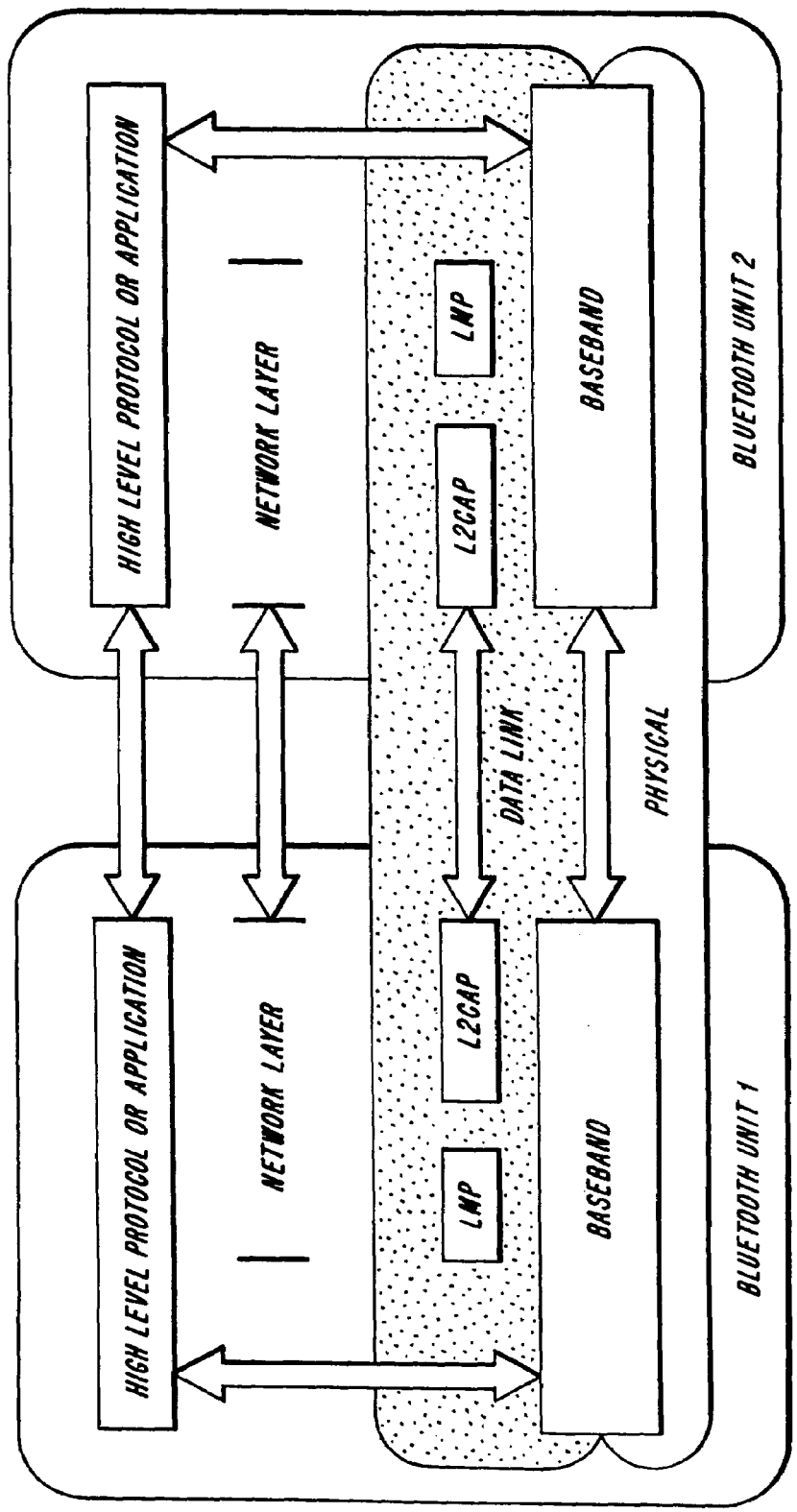
FIG. 4 is a diagram illustrating Bluetooth protocol layers.
Figure 5:
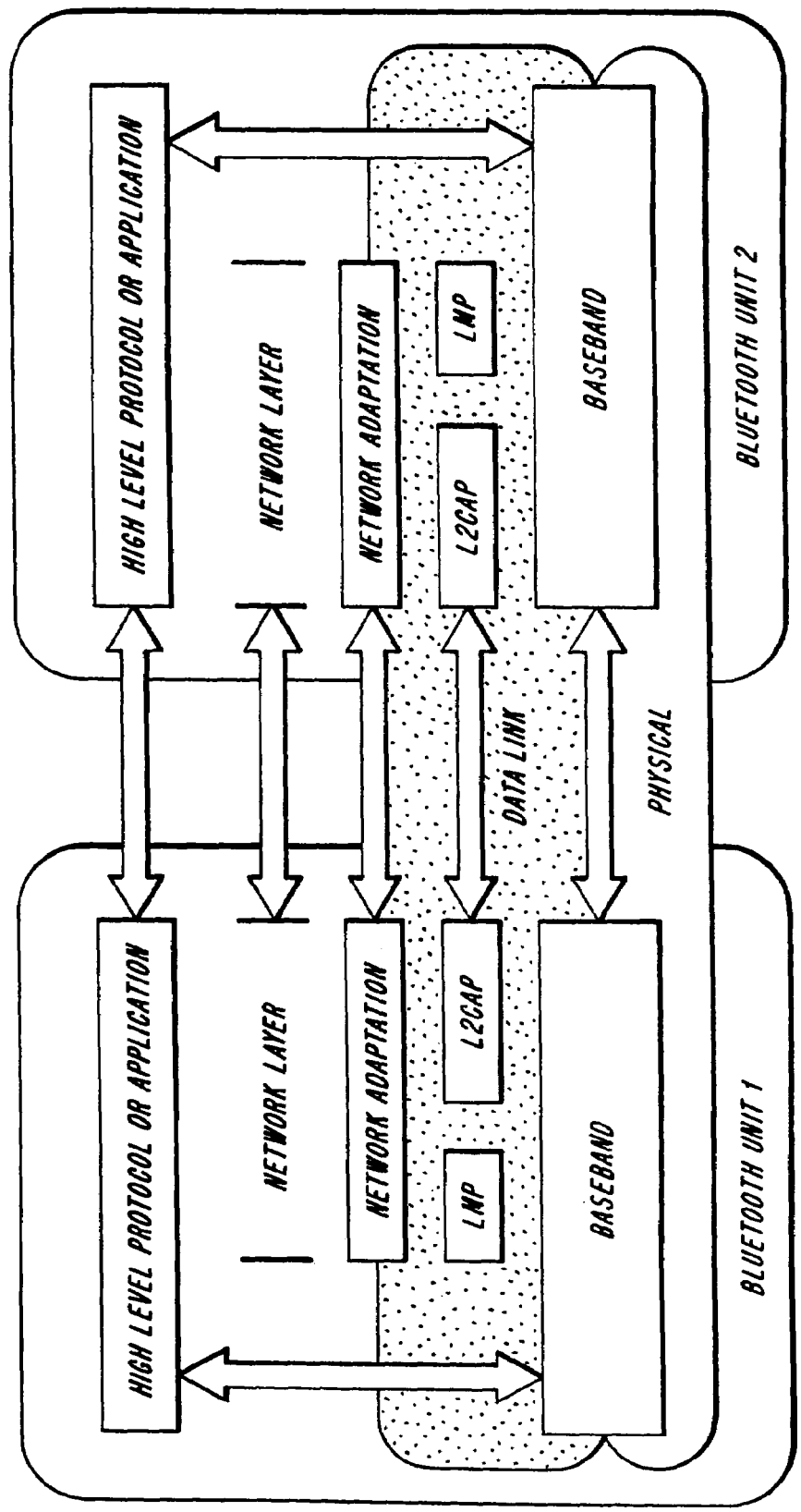
FIG. 5 is a diagram illustrating a Bluetooth protocol layers, including the proposed network adaptation layer.
Figure 6:
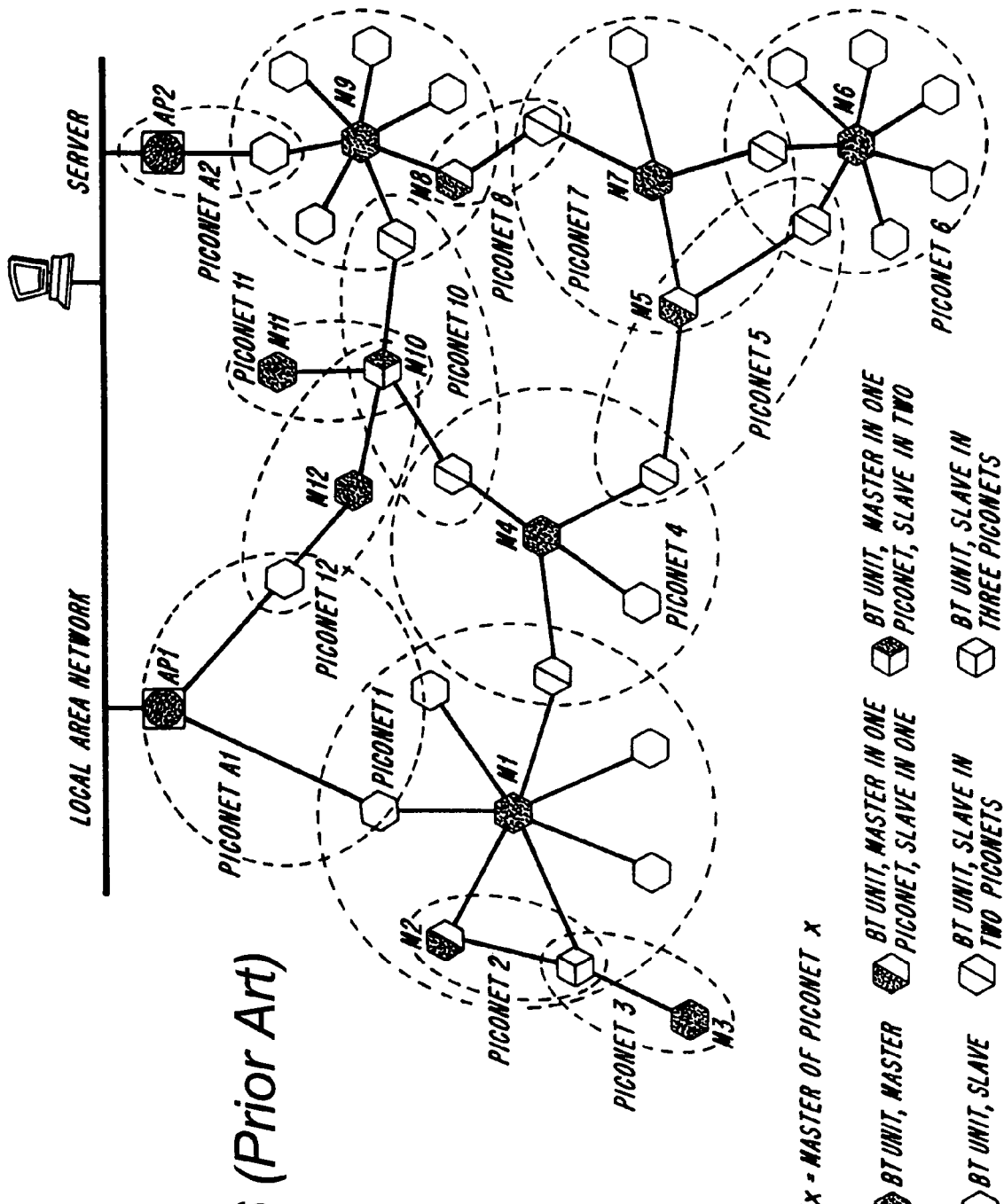
FIG. 6 is a diagram illustrating a Bluetooth scatternet interconnection to another network.
Figure 7:
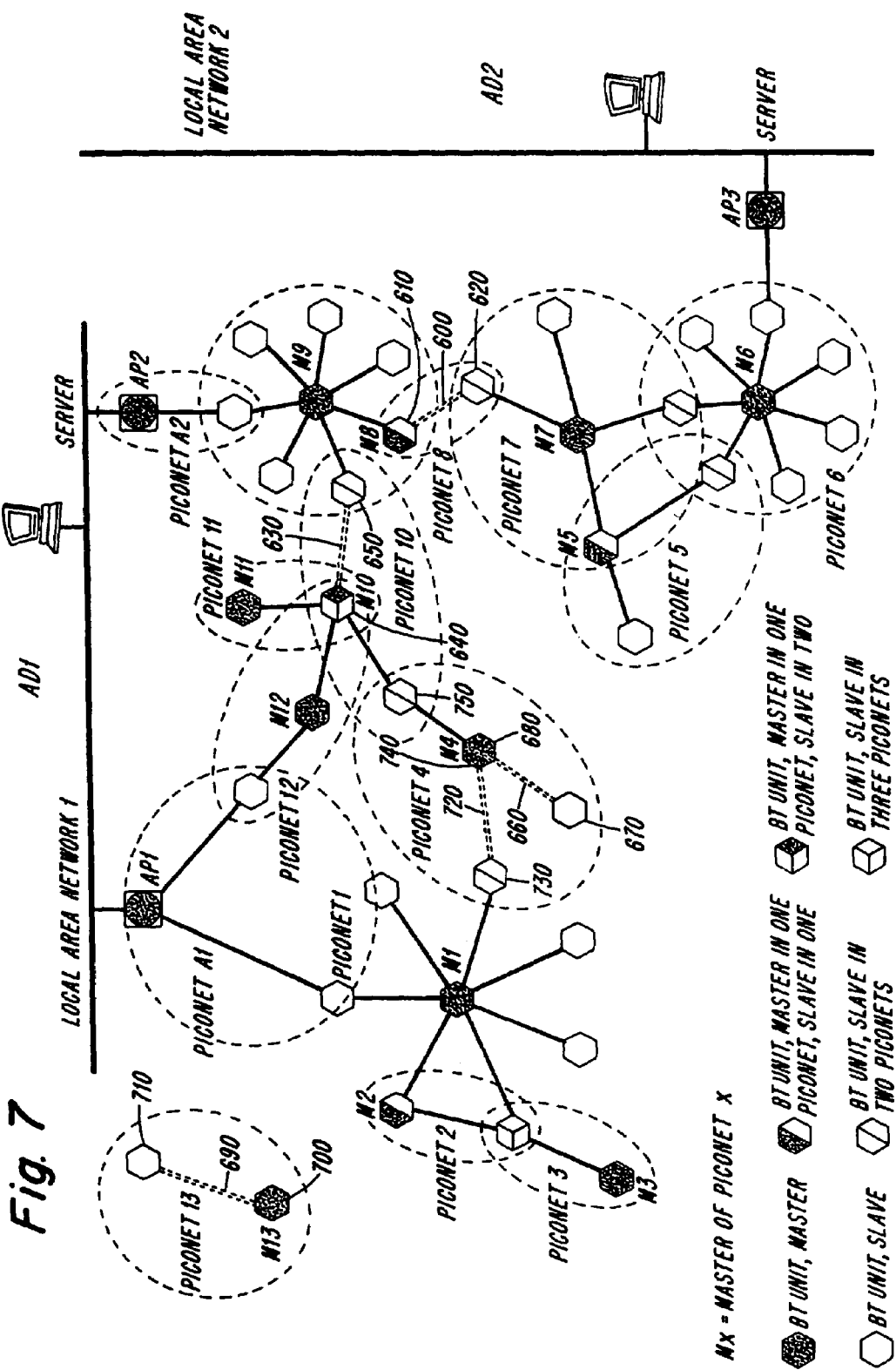
FIG. 7 illustrates formation scenarios in a Bluetooth scatternet connected to two other distinct networks.

Turning again to the drawings, FIG. 7 illustrates a Bluetooth scatternet interconnection to two distinct fixed wire networks, representing two administrative domains, denoted AD1 and AD2. Only nodes (BTs) providing a direct connection to an AD will "own" and advertise an ADAP, other nodes will keep track of which AD they are connected to, using the ADI, and via which ADAP. The upstream pointers kept in nodes will in effect create a directed graph overlaid on the topology of the scatternet, not necessarily having any correspondence with the master/slave relationships in the scatternet.

All access points connected to the same LAN segment are assigned the same ADI via a network management procedure on the LAN. Access points on different LAN segments are assigned different ADIs. For example, in FIG. 7, AP1 and AP2 are connected to LAN 1 (AD1) and AP3 is connected to LAN 2 (AD2). Each access point AP1, AP2, AP3 has an ADAP, which is it's own Bluetooth BD_ADDR.

A mobile Bluetooth node, which hosts a non-public scatternet, can advertise an ADI together with its own BD_ADDR as the ADAP. Nodes forming a general connectivity scatternet (a "public network") do not set any ADI at all, or set a NULL value. Similarly, the ADAP it is not applicable in a public scatternet and would be set to a null value, or not at all.

The ADI and ADAP are exchanged between two nodes on the NAL before sending other NAL signaling and data. Each node compares the received ADI and ADAP with their own. If the ADIs are different, then the two nodes are part of two different administrative domains, and neither of them would be allowed to bridge Ethernet packets on that link.

Referring again to FIG. 7, several formation scenarios that may arise are illustrated. For example, Piconet 13 depicts two nodes (BT units 700, 710) communicating via link 690 (as denoted by double dashed lines). Both nodes have no ADIs when the link is formed since they are not connected to an AD. The connection is activated for both NAL unicast and broadcast traffic and thereby a common "public" scatternet is formed comprising both nodes, and all other nodes that they might have been connected to previously as well.

Another possible formation scenario is depicted by link 660, linking BT units 670 and 680, where one node has an ADI, and the other node does not. Prior to link formation, BT unit 680 communicates with AD1 via AP1 and other interposed BT units. As a result, BT 680 contains a distinct ADI and an ADAP broadcast through the scatternet by AP1. BT unit 670 contains no ADI when link 660 is initiated, since it has not yet communicated with an AP. BT unit 670 may, depending on user and/or application preferences, activate the connection for both NAL unicast and broadcast traffic. BT unit 670 then effectively joins the same AD as BT unit 680, along with any nodes previously connected to BT unit 670. BT unit 670 will store the ADAP received from BT unit 680 and remember BT unit 680 as the upstream connection to the ADAP. BT unit 670 will also propagate the ADI/ADAP information on all other links to nodes previously connected to BT unit 670. They will in turn forward the information to other nodes they may be connected to, to transmit the information throughout the scatternet.

Yet another possible formation scenario is depicted by link 720, linking BT units 730 and 740, where both nodes already have the same ADI and ADAP when the link is initiated. Prior to link formation, BT units 730 and 740 both communicate with AD1 via AP1 and other interposed BT units (assuming link 630 has not been formed yet). As a result, BT units 730 and 740 contain the same distinct ADI and an ADAP broadcast through the scatternet by AP1. The connection is activated for both NAL unicast and broadcast traffic. The NAL routing protocol will prevent the propagation of broadcast loops throughout the scatternet, and more particularly throughout the loop formed by the portion of the scatternet comprised of Piconets A1, 12, 11, 10, 4, 3, 2, and 1 (still assuming link 630 has not been formed yet). One of BT units 730 and 740 will set the other one as a secondary upstream connection provider to the common ADAP, as determined, for example, by a default rule based on their BD_ADDRs. The secondary upstream connection provider related information is preferably maintained locally in the node having multiple connections. While this information can be shared with neighboring nodes, signaling traffic may increase significantly, outweighing any benefits derived by sharing the information.

Still another possible formation scenario is depicted by link 630, linking BT units 640 and 650, where both nodes have the same ADI but different ADAPs. Prior to link formation, BT unit 640 communicates with AD1 via AP1 and other interposed BT units. BT unit 650 communicates with AD1 via AP2 and other interposed BT units. As a result, BT 640 contains a distinct ADI and an ADAP broadcast through the scatternet by AP1, while BT 650 contains the same distinct ADI and a different ADAP broadcast through the scatternet by AP2. Upon establishing link 630, BT units 640 and 650 determine by comparing their ADIs and ADAPs that they are both already connected to the same AD, AD1, which has multiple access points AP1 and AP2. In this case, a bridge is formed between BT units 640 and 650 for NAL unicast traffic, but link 630 may not forward broadcast packets with user data, thereby preventing broadcast loops. However, it is still feasible to forward Bluetooth specific NAL packets that are flooded throughout scatternets for the purpose of route discovery, for example.

Finally, another possible formation scenario is depicted by link 600, linking BT units 610 and 620, where each node has a different ADI and different ADAP. Prior to link formation, BT unit 610 communicates with AD1 via AP2 and other interposed BT units. BT unit 620 communicates with AD2 via AP3 and other interposed BT units. As a result, BT 610 contains a distinct ADI and an ADAP broadcast through the scatternet by AP1, while BT 620 contains a different distinct ADI and a different ADAP broadcast through the scatternet by AP2. When link 600 is established, creating Piconet 8, BT units 610 and 620 will initially exchange and compare their ADIs. In this case, a connection must not be maintained at the NAL layer. However, it would still be feasible to perform IP routing, or some other higher-level interconnection mechanism in a node being connected to two distinct Administrative Domains. The point is that the ADs must not be bridged together.

In each scenario, the ADI/ADAP Information is spread throughout the existing scatternet. The information can be stored in a storage within the nodes, in case a scatternet that is connected to a LAN via an access point loses that connection.

In effect, the unique combination of ADI and ADAP creates a broadcast subdomain for user data broadcasts. The transmission of NAL packets for the purpose of route discovery, for example, is not limited to these subdomains, but will always be limited to one ADI domain. As a scatternet is built up over time in an environment where there are multiple access points to the same LAN, the scatternet will contain several distinct broadcast subdomains. The subdomains pertain to the Bluetooth side of the overall network only. The ADI/ADAP domains are in turn interconnected by the access points which bridge to the same LAN backbone network, thereby creating one single broadcast domain comprising the LAN backbone and the Bluetooth scatternet nodes.

If or when links are lost, islands of nodes that lost a (possibly indirect) connection to one ADAP revert to secondary upstream connection providers to that ADAP, or if no such provider exists, they notify downstream nodes of the loss of the upstream provider. In such a case, a node further downstream may still provide a valid upstream connection to the ADAP (if there were loops). This process can be illustrated with reference to FIG. 7, with focus on the piconets to the left of link 630 (Piconets A1, 12, 11, 10, 4, 3, 2, and 1), and assuming link 630 has not been formed. Assume further, for example, the associated links within this portion of the scatternet were established in such an order that node 730 is the upstream provider for node 740. That is, assume node 740 established a connection with node 730 first, and then with node 750. The subsequent connection to node 750 provides node 740 with a secondary upstream connection possibility via node 750. However, node 740 will not know about the secondary upstream connection until needed. Then, if the connection between M1 and node 730 is lost, node 730 will notify node 740 that it has lost its upstream connection. Node 740 will then notify node 750 that it has lost its upstream connection. Node 750 can then notify 740 that an upstream connection to the ADAP exists via node 750 and the other interposed nodes (hence, the secondary upstream connection). Node 740 resumes communication with the ADAP using node 750 as a the upstream connection. Node 740 also notifies node 730, which resumes communication with the ADAP using node 740 as a the upstream connection.

Accordingly, the invention solves the three related problems regarding broadcast loops when scatternets are bridged to LANs at multiple places, prevention of inappropriately interconnected LANs, and scoped scatternets (public/private). It does so with minimal information exchange overhead, since ADI/ADAPs are only exchanged before and during NAL connection setups, and when disruptive network changes occur, such as when NAL connections are lost somewhere in a scatternet.

The invention has been described with reference to Bluetooth, using Bluetooth terminology. However, it will be apparent to one of ordinary skill in the art that the invention is applicable to other network technologies, both wired and wireless. In addition, while connection between an ad-hoc network and a fixed network or LAN is illustrated, it will be apparent to one of ordinary skill in the art that the invention is not limited to communication with fixed networks, but will support communications between an ad-hoc network and any non-ad-hoc network as well.

It will be appreciated that the procedures illustrated above may be readily implemented either by software that is executed by a suitable processor or by hardware, such as an application-specific integrated circuit (ASIC).

Although described with reference to a communication system, it will be appreciated by those of ordinary skill in the art that this invention can be embodied in other specific forms without departing from its essential character. For example, the invention may be used in any multi-processor system. The embodiments described above should therefore be considered in all respects to be illustrative and not restrictive.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method for determining whether to establish a connection between a first node and a second node in an ad-hoc network, the method comprising the steps of:
   sending from the first node to the second node a first message, the first message including a network identifier and a point of attachment identifier;
   receiving, by the second node, the first message;
   comparing, by the second node, the network identifier and the point of attachment identifier of the first message with a network identifier and point of attachment identifier stored in the second node;
   determining whether to establish the connection between the first node and the second node based upon the comparison; and
   establishing the connection between the first node and the second node if the network identifiers are the same but the point of attachment identifiers are not the same, wherein the connection does not carry broadcast packets.

2. A method for determining whether to establish a connection between a first node and a second node in an ad-hoc network, the method comprising the steps of:
   sending from the first node to the second node a first message, the first message including a network identifier and a point of attachment identifier;
   receiving, by the second node, the first message;
   comparing, by the second node, the network identifier and the point of attachment identifier of the first message with a network identifier and point of attachment identifier stored in the second node;
   determining whether to establish the connection between the first node and the second node based upon the comparison; and
   if the network identifiers and the point of attachment identifiers are the same, then performing the additional steps of:
   establishing the connection between the first node and the second node; and
   setting one of the first or second nodes as a secondary connection to an access point associated with the access point identifier.

3. An electronic device for communicating in an ad-hoc network and for determining whether to establish a connection with another node of the ad-hoc network, the electronic device comprising;

a transceiver that receives a first message transmitted from the other node, the first message including a network identifier and a point of attachment identifier;

a comparing means that compares the network identifier and the point of attachment identifier of the first message with a network identifier and point of attachment identifier stored in a storage of the electronic device; and determining means that determines whether to establish the connection between the other node and the electronic device based upon the comparison, wherein the connection between the electronic device and the other node is established if the network identifiers are the same but the point of attachment identifiers are not the same, wherein the connection does not carry broadcast packets.

4. An electronic device for communicating in an ad-hoc network and for determining whether to establish a connection with another node of the ad-hoc network, the electronic device comprising:

a transceiver that receives a first message transmitted from the other node, the first message including a network identifier and a point of attachment identifier;

a comparing means that compares the network identifier and the point of attachment identifier of the first message with a network identifier and point of attachment identifier stored in a storage of the electronic device; and determining means that determines whether to establish the connection between the other node and the electronic device based upon the comparison, wherein if the network identifiers and the point of attachment identifiers are the same, then the connection between the electronic device and the other node is established and one of the electronic device and the other node is set as a secondary connection to an access point associated with the access point identifier.

5. A computer program product in an electronic device for communicating in an ad-hoc network, the computer program product comprising:

a computer-readable storage medium having computer-readable program code means embodied in said medium, said computer-readable program code means including;

logic that receives a first message, at the electronic device, from another node of the ad-hoc network, the first message including a network identifier and a point of attachment identifier;

logic that compares the network identifier and the point of attachment identifier of the first message with a network identifier and point of attachment identifier stored in a storage of the electronic device;

logic that determines whether to establish the connection between the electronic device and the other node based upon the comparison; and additional logic that establishes the connection between the electronic device and the other node if the network identifiers are the same but the point of attachment identifiers are not the same, wherein the connection does not carry broadcast packets.

6. A computer program product in an electronic device for communicating in an ad-hoc network, the computer program product comprising:

a computer-readable storage medium having computer-readable program code means embodied in said medium, said computer-readable program code means including:

logic that receives a first message, at the electronic device, from another node of the ad-hoc network, the first message including a network identifier and a point of attachment identifier;

logic that compares the network identifier and the point of attachment identifier of the first message with a network identifier and point of attachment identifier stored in a storage of the electronic device;

logic that determines whether to establish the connection between the electronic device and the other node based upon the comparison; and additional logic that, if the network identifiers and the point of attachment identifiers are the same, performs:

establishing the connection between the electronic device and the other node; and setting one of the electronic device and the other node as a secondary connection to an access point associated with the access point identifier.

* * * * *